Dec. 6, 1960     W. L. WOODWARD     2,963,037
MAGNETIC CONTROL FOR FLOAT VALVES
Filed June 23, 1958     3 Sheets-Sheet 1

WILLIAM LEO WOODWARD
INVENTOR.

BY *(signature)*

ATTORNEYS

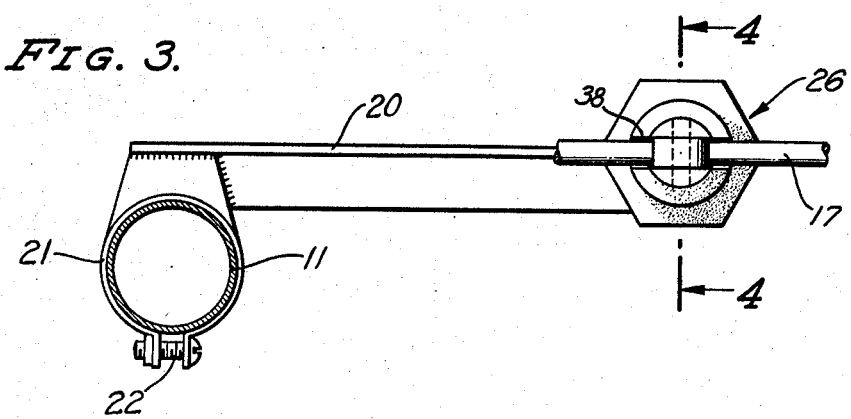
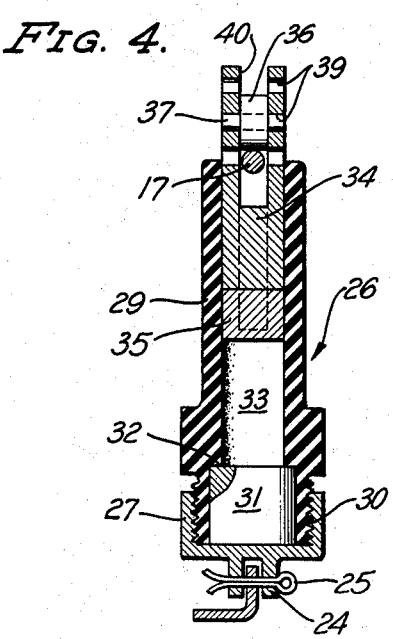
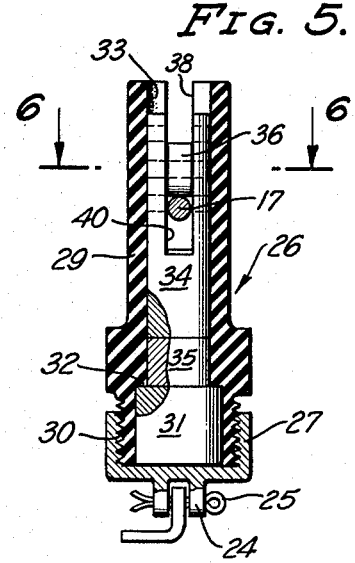
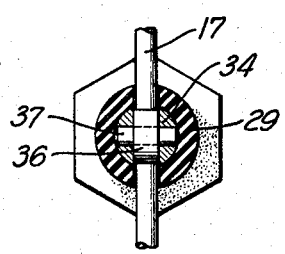
WILLIAM LEO WOODWARD
INVENTOR.

WILLIAM LEO WOODWARD
INVENTOR.

ATTORNEYS

United States Patent Office 2,963,037
Patented Dec. 6, 1960

2,963,037

MAGNETIC CONTROL FOR FLOAT VALVES

William L. Woodward, 4440 Tyler, Arlington, Calif.

Filed June 23, 1958, Ser. No. 743,809

2 Claims. (Cl. 137—416)

This invention relates to controls for float valves and more particularly to a magnetic control of a float valve in a toilet water storage tank where it is necessary or desirable to obtain a rapid filling of the storage tank and silient operation of the valve.

The float valves for water closets found in general use have the undesirable features of requiring a considerable amount of time to fill the storage tank and creating a hissing or whistling noise due to throttling of the inflowing water. Both of these features are a result of the valve function whereby the valve opening during the filling of the tank has been gradually reduced as the water approaches its high level.

It is the object of my invention to obviate these undesirable features by providing a simple and inexpensive magnetic control for the float valve whereby the valve is maintained open to its maximum position until the water level has risen to a predetermined level when the valve is rapidly closed.

It is a further object of my invention to provide an inexpensive attachment for a standpipe of a water storage tank having a magnetic control means therein connected to the arm of a float valve to hold the valve in its maximum open position until the water in the tank has reached a predetermined level.

A further object of my invention is to provide a magnetic control means in a toilet water storage tank to attract and hold the float valve in a submerged position until buoyancy overcomes the magnetic force allowing the valve to close rapidly when the water level has reached the desired level.

Other objects and many of the novel features of the invention will be more fully understood by the following specification and drawings wherein:

Figure 3 is a top sectional view of my magnetic control device and mounting bracket taken along line 3—3 of Figure 1.

Figure 4 is a sectional view taken along the line 4—4 of Figure 3 and showing in detail the embodiment of my invention shown in Figure 1 with the float valve in its closed position.

Figure 5 is a sectional view similar to Figure 4 except that the magnetic control device is holding the float valve in its open position as in Figure 2.

Figure 6 is a top sectional view taken along the line 6—6 of Figure 5.

Figure 1:
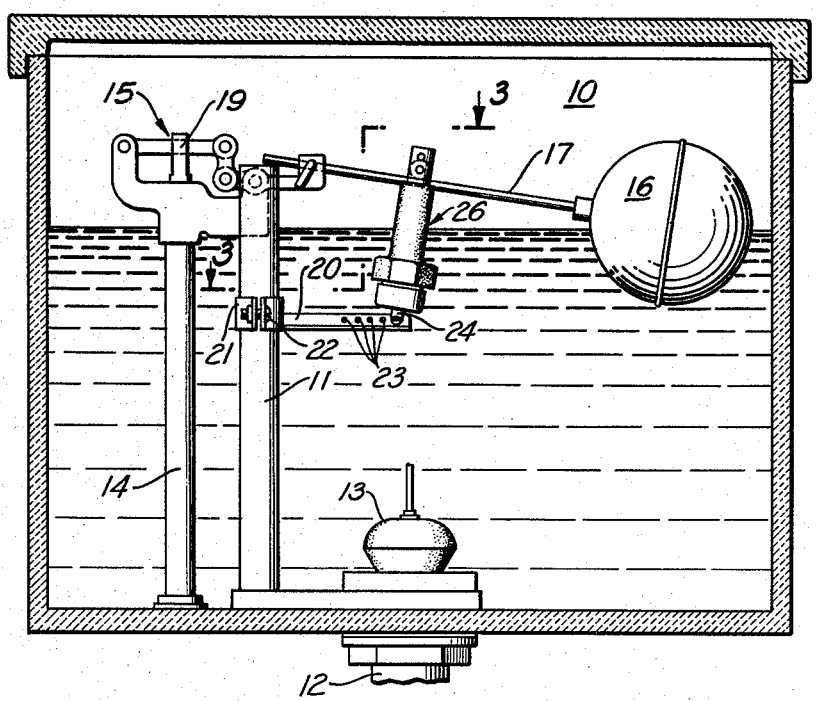
Figure 1 is a side elevation sectional view of a toilet water storage tank showing one embodiment of my invention attached to the standpipe and float valve just prior to a flushing cycle.

Referring to the drawings in detail and more particularly to the first embodiment of my invention illustrated in Figures 1-6 a storage tank 10 has mounted therein the conventional overflow standpipe 11, a discharge pipe 12 in communication with a flush bowl (not shown), a rubber stopper valve 13 which is raised to flush the bowl by conventional means (not shown) and an inlet pipe 14 having a conventional float controlled valve 15 mounted at its upper end. The valve is opened and closed in the usual manner by a float 16 mounted on the normally free end of a rod 17 and the opposite end of the rod 17 is secured to a link-lever system to raise and lower the plunger 19 of the valve 15.

A horizontal mounting bracket 20 is secured to the standpipe 11 by a collar 21 and bolt and nut 22 or other suitable means. The bracket 20 has a plurality of holes 23 adjacent its outer end and the first embodiment of my invention is pivotally secured by a clevis 24 and a pin 25 to any one of the holes 23 depending upon the leverage and extent of movement desired.

As shown in Figures 4 and 5 the magnetic control member 26 comprises a cup-shaped bottom 27 integral with the clevis mounting 24, a hollow neoprene or other nonmagnetic cylinder 29 secured by threads 30 or other suitable means to the bottom cup 27 and a permanent magnet 31 of Alnico or other suitable permanent magnetic alloy which is retained against the bottom cup 27 by a shoulder 32 formed by the reduced longitudinal bore 33 in the cylinder 29.

A reciprocally mounted plunger or armature 34 slides freely in the bore 33 as hereinafter described. The plunger 34 is made of brass or any suitable non-magnetic material and a plug 35 secured to the lower end of the plunger 34 is of a ferro-metallic material and is thus attracted by the magnet 31 to pull the plunger down into the bore 33 as set forth below.

The upper end of the plunger 34 is slotted to receive a roller 36 pivotally mounted on a shaft 37 in any one of a plurality of bores 39 extending laterally through the upper end of the plunger and normal to the slot 40. As can readily be seen the rod 17 rides freely in the slot 40 and is retained in said slot by the roller 36. A slot 38 is also provided in the cylinder 29 to allow vertical movement of the rod 17 therein when the rod is in its lowermost positions.

In the operation of this embodiment, when the valve member 13 is lifted by the conventional flush handle, the water is discharged from the tank 10, and the float 16 is allowed to fall and open the valve 15, to thereby admit a fresh supply of water to the tank 10. During the emptying of the tank the rod 17 seats on the lower end of the slot 40 and forces the plunger 34 downwardly until the magnetic force of the magnet 31 attracts the plug 35 and pulls the plunger 34 and plug 35 down against the top of the magnet 31.

After the flush cycle has ended and the tank commences to fill the force of the magnet 31 on plug 35 holds the plunger 34 in its lowermost position. The float 16 is urged upwardly by the water as its level rises, however, the roller 36 restrains any upward motion of the float 16 and rod 17 as long as the force of the magnet attracting the plug 35 is large enough to overcome the buoyant force on the float 16 acting on the end of the lever arm of rod 17, and the valve 15 is maintained at its maximum open position. When the level of the water in the tank has reached approximately its uppermost level the buoyant force on the float 16 is sufficient to overcome the effect of the magnet 31 on the plug 35 and plunger 34 allowing the rod 17 through the link-lever system to close the valve 15 in a quick acting manner thus eliminating any hissing or whistling noise commonly heard in many water closets.

Figure 2:
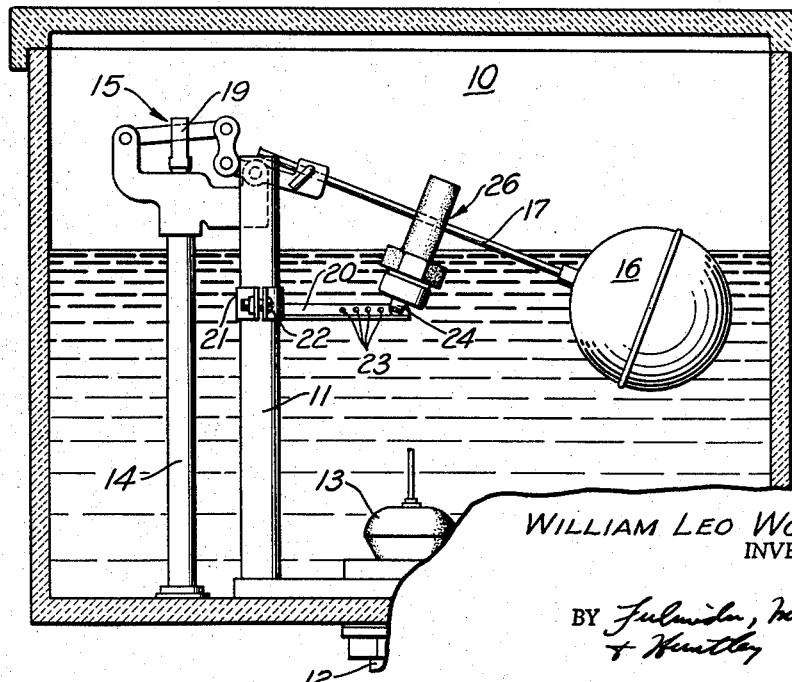
Figure 2 is a side elevation similar to Figure 1 except that the tank is filling after the end of the flushing cycle and the float valve is being restrained in its maximum open position by my magnetic control attachment.
Figure 7:
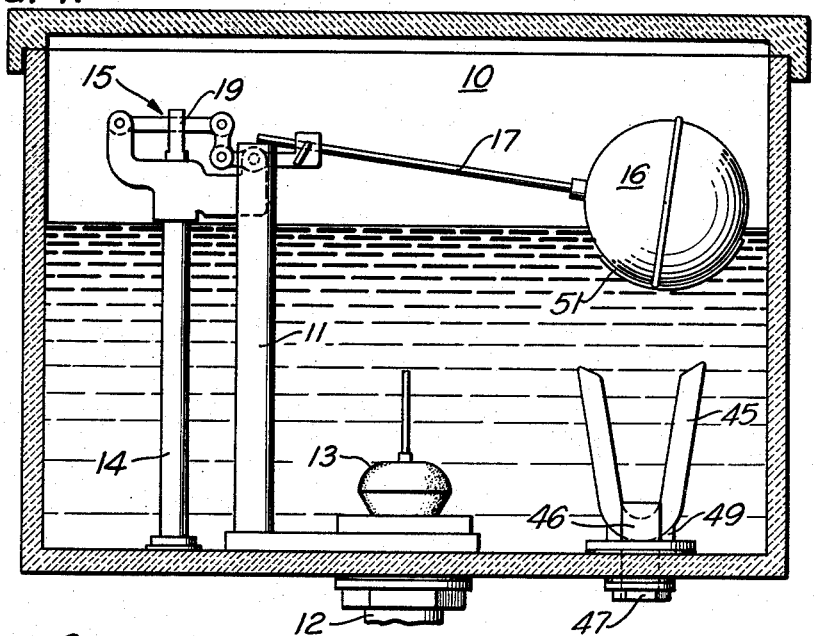
Figure 7 is a side elevation sectional view of a toilet water storage tank illustrating a second embodiment of my invention wherein the tank is full and ready for the flushing cycle.
Figure 8:
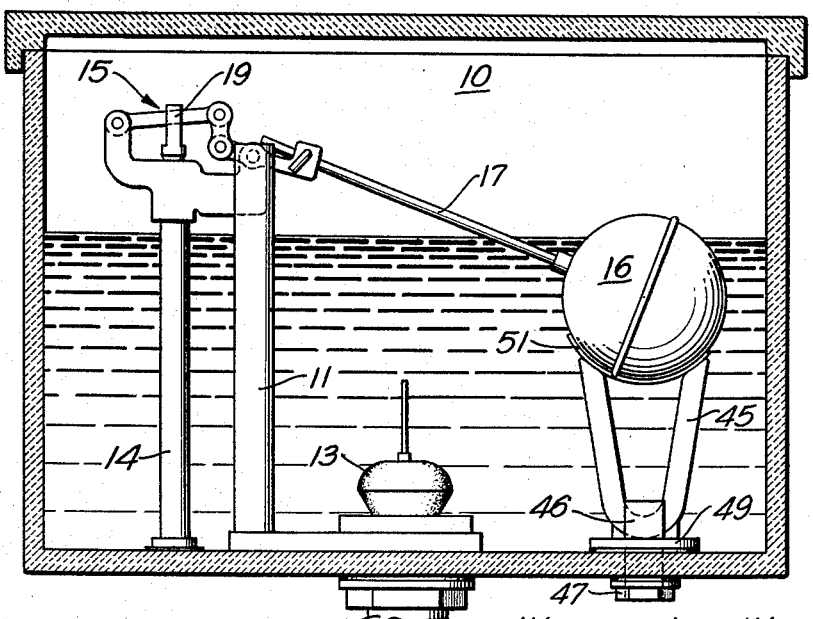
Figure 8 is a sectional view similar to Figure 7 wherein the float valve is being held open by the second embodiment of my invention.

Referring to Figures 7 and 8 the second embodiment of my invention is shown installed in a toilet water storage tank similar to the tank illustrated in Figures 1 and 2 and comprises a U-shaped permanent magnet 45 secured to the bottom of the tank 10 by means of a horseshoe bolt 46 and nuts 47. A base member 49 provides a seat for the magnet 45 in order to maintain the magnet in an upright position.

The ball float 16 is normally of a non-magnetic material therefore a strap 51 of steel, soft iron, or other magnetic material is secured by soldering or other suitable means to the bottom part of the float 16 whereby the float 16 is attracted by the magnet 45.

In operation of this second embodiment the storage tank is full as shown in Figure 7 and ready to empty by operating the conventional flush handle thus raising the valve member 13. The valve 15 is closed and retained closed by the conventional float 16 and rod 17. The float 16 is spaced from the ends of the magnet 45 a distance sufficient to overcome the attraction between the strap 51 and the magnet and is maintained in this position by the buoyant force of the water.

After the flush cycle has been completed and the water level has been lowered in the tank 10 allowing the float 16 to come to rest on the magnet 45, the magnet 45 will hold the float 16 through the strap 51 in the position shown in Figure 8 as the tank is filling. With the float 16 in this position the valve 15 is at its maximum open position and the tank 10 is filled at a constant rate. The magnet 45 is of sufficient strength to hold the float in this position until the level of the water in the tank 10 has approximately reached the desired level at which time the buoyant force of the water on the float 16 is sufficient to overcome the magnetic attraction between the strap 51 and the magnet 45. Upon release of the float 16 by the magnet 45 the valve 15 is closed in a quick acting manner through the rod 17 and the link-lever system whereby any hissing or whistling noise commonly associated with many water closets is eliminated.

It is to be understood that the above described embodiments of my invention are for the purpose of illustration only and various changes may be made therein without departing from the spirit and scope of my invention.

What is claimed is:
1. A device of the character described for use in a storage tank for liquid having an inlet pipe and a valve on said pipe adapted normally to maintain liquid at a predetermined level in said tank; an overflow standpipe mounted in said tank, a float movably connected to said valve by a rod, a cylindrical housing pivotally mounted on said standpipe and having a longitudinal bore therein, a magnet mounted in said bore adjacent the lower end thereof, a plunger member reciprocally mounted in said bore, a magnetizable plug connected to the end of said plunger adjacent said magnet, an elongated slot provided adjacent the opposite end of said plunger, a roller pivotally mounted in said slot and adapted to control upward movemnet of said rod and float whereby said float is maintained in a depressed position when said tank is empty and until the liquid has risen therein substantially to said predetermined level.

2. A device of the character described for use in a storage tank for liquid having an inlet pipe, a valve on said pipe, and an outlet in the lower portion of said tank comprising: an inlet pipe in said storage tank having attached to the upper end thereof and within said tank a valve adapted to be opened and closed by upward and downward movement of a valve member; a housing mounted in said tank, said housing comprising a hollow cylinder; a magnet mounted in the lower portion of said housing; a magnetically attractable plug slidably mounted in said cylinder; an arm movably connected between said plug and a rod; said rod connected at one end thereof to a float and at the other end thereof to the said valve member; said magnet being strong enough to hold the said plug in contact with said magnet during periods of time in which the liquid level of said storage tank is slightly less than completely full and said magnet being weak enough that it releases said plug when said liquid level nears the top of said tank and it is overcome by the buoyancy of said float.

References Cited in the file of this patent
UNITED STATES PATENTS

| 2,550,313 | Tucker | Apr. 24, 1951 |
| 2,788,018 | Sogn | Apr. 9, 1957 |
| 2,822,816 | Schutmaat | Feb. 11, 1958 |
| 2,837,111 | Mueller | June 3, 1958 |

FOREIGN PATENTS

| 764,876 | Great Britain | Jan. 2, 1957 |